US006778414B2

(12) United States Patent
Chang et al.

(10) Patent No.: US 6,778,414 B2
(45) Date of Patent: Aug. 17, 2004

(54) DISTRIBUTED SYSTEM AND METHODOLOGY OF ELECTRICAL POWER REGULATION, CONDITIONING AND DISTRIBUTION ON AN AIRCRAFT

(75) Inventors: Jie Chang, Thousand Oaks, CA (US); Charles H. LeMond, St. Peters, MO (US); Anhua Wang, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/324,632

(22) Filed: Dec. 20, 2002

(65) Prior Publication Data

US 2004/0119454 A1 Jun. 24, 2004

(51) Int. Cl.$^7$ .................................................. H02M 7/00
(52) U.S. Cl. .......................................... 363/67; 363/70
(58) Field of Search ............................. 363/65, 67, 69, 363/70

(56) References Cited

U.S. PATENT DOCUMENTS

| | | | | |
|---|---|---|---|---|
| 3,803,478 A | * | 4/1974 | Honey | 322/28 |
| 4,210,857 A | * | 7/1980 | Korbell | 322/28 |
| 4,330,743 A | * | 5/1982 | Glennon | 322/10 |
| 4,572,961 A | * | 2/1986 | Borger | 290/4 R |
| 4,931,919 A | * | 6/1990 | Nguyen et al. | 363/37 |
| 4,967,096 A | * | 10/1990 | Diemer et al. | 307/19 |
| 5,549,524 A | * | 8/1996 | Yang | 477/3 |
| 5,644,200 A | * | 7/1997 | Yang | 322/47 |
| 5,777,459 A | * | 7/1998 | Bansal et al. | 322/47 |
| 5,892,677 A | | 4/1999 | Chang | 363/152 |
| 6,154,378 A | * | 11/2000 | Peterson et al. | 363/37 |

OTHER PUBLICATIONS

T. H. Barton, "Rectifier, Cycloconverters and AC Controllers," Clarendon Press, Oxford 1994 (pp. 420–429), no month.

* cited by examiner

Primary Examiner—Bao Q. Vu
(74) Attorney, Agent, or Firm—Thompson Coburn LLP

(57) ABSTRACT

A novel system and methodology of electrical power regulation, conditioning and distribution on an aircraft is disclosed. The system comprises an alternator adapted to directly connect to an engine on the aircraft and generate variable frequency AC power, a variable frequency AC bus coupled directly to the alternator, and at least one variable frequency AC load at low performance, coupled to the variable frequency AC bus. At least one bi-directional power converter may be coupled directly to the variable frequency AC bus and adapted to convert the variable frequency AC raw power to a fully regulated adjustable-frequency and adjustable-voltage power to control AC motors and other high performance variable frequency AC loads. A bi-directional power converter is coupled directly to the variable frequency AC bus and adapted to convert the variable frequency AC power generated by the alternator into constant frequency AC power. At least one constant frequency AC load is coupled to a constant frequency AC bus which is in turn coupled between the constant frequency AC load and the bi-directional power converter. A first bi-directional power bus controller is coupled between the bi-directional power converter and the constant frequency AC bus. The system further comprises an AC/DC bi-directional power converter coupled to a DC bus and at least one DC load coupled thereto. A second bi-directional power bus controller is coupled between the AC/DC power converter and the DC bus. The first and second bi-directional controllers provide for the selective and automatic reconfiguration of the flow of power through the system. A novel high-level subsystem interconnection architecture is also disclosed.

21 Claims, 4 Drawing Sheets

DISTRIBUTED SYSTEM AND METHODOLOGY OF ELECTRICAL POWER REGULATION, CONDITIONING AND DISTRIBUTION ON AN AIRCRAFT

CROSS REFERENCE TO RELATED APPLICATION none.

STATEMENT REGRADING FEDERALLY SPONSORED RESEARCH OR DEVELOPMENT none.

BACKGROUND OF INVENTION

This invention generally pertains to implementation of innovative electrical power regulation, conditioning and distribution on an aircraft and more specifically, to a system and method for regulating, conditioning and distributing both constant and variable frequency electrical power in a more efficient and distributed manner to a plurality of different types of loads on an aircraft.

The primary electrical power systems on current commercial aircraft are provided by a 400 Hz constant frequency (CF) 3-phase 115V AC power source. As shown in FIG. 1, an engine produces mechanical power that is input to a device called an integrated drive generator (IDG). The IDG is used to convert the mechanical power at variable speed rotation of each aircraft engine into constant rotational speed as required so that the alternator can produce CF electrical power. The IDG consists of mechanical and hydraulic mechanisms to regulate the rotational speed of the generator. First, the variable speed input is converted by the IDG to a well-regulated constant speed. Then, an alternator coupled on the shaft of the IDG generates the CF electrical power. Conventionally, all AC loads, such as induction motors, are run directly from the 400 Hz AC power bus, while transformer rectifier units transform the AC power into DC for loads that require DC power.

Although most in-service aircraft employ the IDG-based, mechanically regulated CF power system, the IDG is a complex device made up numerous mechanical and hydraulic parts that are subject to extensive wear and tear. As a result, they are maintenance-intensive. Moreover, it takes only one faulty part to render the entire IDG inoperable, thereby limiting their reliability. In fact, their low reliability is a significant cause of flight schedule disruptions for commercial aircraft, not to mention a safety concern.

Given the complexity of IDGs, they are necessarily very expensive devices, especially when one takes into account the additional costs associated with their maintenance. Typical IDGs can cost anywhere in the range of $50,000–$100,000 per device, depending on the particular power requirements. Their size and weight are also fairly significant in order to accommodate all of the components that make up these devices. Given that an aircraft requires one IDG per engine, and most commercial aircraft have at least two to four engines, their weight and size has a substantial and negative impact on an aircraft's fuel consumption.

On the other hand, many of the electrical AC loads on an aircraft, such as galley and turbo-fan loads, are not frequency sensitive and can operate satisfactorily with a variable frequency (VF) power source directly. However, as shown in FIG. 1, conventional power systems employing IDGs distribute expensive CF power to all loads regardless of whether or not they need it. In addition, increasing the number of stages of power conversion required increases power losses and associated heat dissipation. Therefore, more power is required to operate the aircraft, thereby decreasing the aircraft's overall energy conversion efficiency. Moreover, IDGs themselves have a fairly low efficiency rate of approximately seventy percent (70%). Such inefficiencies in turn negatively affect power distribution and fuel efficiency, which in turn further increase the costs associated with operating the aircraft.

While many existing on-board AC loads operate satisfactorily with a variable-frequency power source, some electrical motors powering the on-board turbo-fan systems cannot. With a wide uncontrolled variable excitation frequency, the motor's output torque and speed largely deviates from the desired operating characteristics. The motor's torque also naturally decreases with increasing input power frequency above its base frequency, creating the potential of shifting the operating point to an unstable operating range. This problem can be partially addressed by using larger motors. However, the use of larger motors results in unacceptable increased heat rejection, weight, size and cost.

This problem can also be addressed by using power converters. Existing conventional cycle converters, however, are not fully optimized for aircraft applications. They generate harmonic pollution on the power bus, which can potentially cause malfunction or damage to other avionics equipment connected to the bus. This is especially true in the case of medium and large aircraft that contain large numbers of motor loads. For example, a Boeing 777 may contain ten such motors, and an even larger aircraft may contain up to 20 such motors. Due to the excessive harmonics, the output frequency of such converters is significantly limited. For example, the output frequency of a conventional cycle-converter is limited to less than $\frac{1}{3}$ of the input frequency. Another type of existing conventional power converters are designed to have transformer-rectifier front-end feeding an IGBT based inverter bridge. However, they are application specific and are not capable of bi-directional power control. As a result, existing electrical power systems on aircraft cannot efficiently handle power conversion losses and typically incorporate a complex architecture to facilitate any required reconfiguration.

As a result, there is a need for an improved system and method for regulation, conditioning and distribution of electric power on an aircraft.

BRIEF SUMMARY OF THE INVENTION

An improved and novel system for regulating, conditioning and distributing electrical power on an aircraft is disclosed. The system comprises an alternator adapted to directly connect to an engine on the aircraft and generate variable frequency AC power, a variable frequency AC bus coupled directly to the alternator, and at least one of variable frequency AC load, coupled to the variable frequency AC bus. A bi-directional power converter is coupled directly to the variable frequency AC bus and adapted to convert the variable frequency AC power generated by the alternator into constant frequency AC power. At least one bi-directional, power converter may also be coupled directly to the variable frequency AC bus and adapted to convert the variable frequency AC raw power to a fully regulated adjustable-frequency and adjustable-voltage power to control AC motors or other high performance AC loads. At least one constant frequency AC load is coupled to a constant frequency AC bus that is in turn coupled between the constant frequency AC load and the bi-directional power converter. A first power bus controller is coupled between the power converter and the constant frequency AC bus and adapted to selectively and automatically reconfigure the direction of the flow of power there through. In a preferred embodiment, the power converter is bi-directional and adapted to convert constant frequency AC power to variable frequency AC power.

The system may further include at least one high-voltage DC load, a DC bus coupled to the at least one DC load, and an AC/DC power converter coupled between the constant frequency AC bus and the DC bus and adapted to convert the constant frequency AC power to DC power. In a preferred embodiment, the AC/DC power converter is bi-directional and adapted to convert DC power to constant frequency AC power. The system further preferably includes a second bi-directional power bus controller coupled between the AC/DC converter and the DC bus and adapted to selectively and automatically reconfigure the direction of the flow of power there through. The first and second bi-directional controllers provide for the selective and automatic reconfiguration of the flow of power through the system.

The system may further include at least one low-voltage DC load, and a DC/DC power converter coupled between the DC bus and the low voltage DC load and adapted to convert DC power to low voltage DC power, as well as a first power conditioner coupled to the constant frequency AC bus, and a second power conditioner coupled to the DC bus. The system also preferably includes an emergency power source coupled to the second bi-directional controller.

A system for electrical power regulation, conditioning and distribution on an aircraft including a first electrical power subsystem adapted to connect to a first engine on the aircraft, a second power subsystem in a parallel with the first electrical power subsystem and adapted to connect to a second engine on the aircraft, and at least one first bi-directional power bus controller coupled between the first electrical power subsystem and the second electrical power subsystem and adapted to selectively and automatically reconfigure the flow of power through the system distribution of electrical power is also disclosed.

A method of regulating and distributing electrical power on an aircraft is also disclosed. The method includes the steps of generating variable frequency AC power from an alternator adapted to directly connect to an engine on the aircraft distributing the variable frequency AC power to at least one variable frequency AC load coupled to the alternator, converting the variable frequency AC power to a constant frequency AC power with a bi-directional power converter, and distributing the constant frequency AC power to at least one constant frequency AC load coupled to the bi-directional power converter. The method may further include converting the constant frequency AC power to DC power with a bi-directional AC/DC power converter, and distributing the DC power to at least one high-voltage DC load coupled to the bi-directional AC/DC power converter. The method further preferably includes selectively and automatically reconfiguring the direction of a flow of power through the system.

A method of regulating the distribution of a flow of electrical power on an aircraft is also disclosed. The method includes converting a first flow of power through a first bi-directional power converter, converting a second flow of power through a second bi-directional power converter, and selectively and automatically reconfiguring the direction of the first and second flows of power through the first and second bi-directional power converters, respectively. The method further includes distributing the first flow of power to at least one constant frequency AC load on the aircraft, and distributing the second flow of power to at least one DC load on the aircraft. The method preferably further includes distributing the second flow of power to at least one constant frequency AC load on the aircraft, and distributing the first flow of power to a variable frequency AC load on the aircraft.

DETAILED DESCRIPTION OF THE INVENTION

Figure 1:
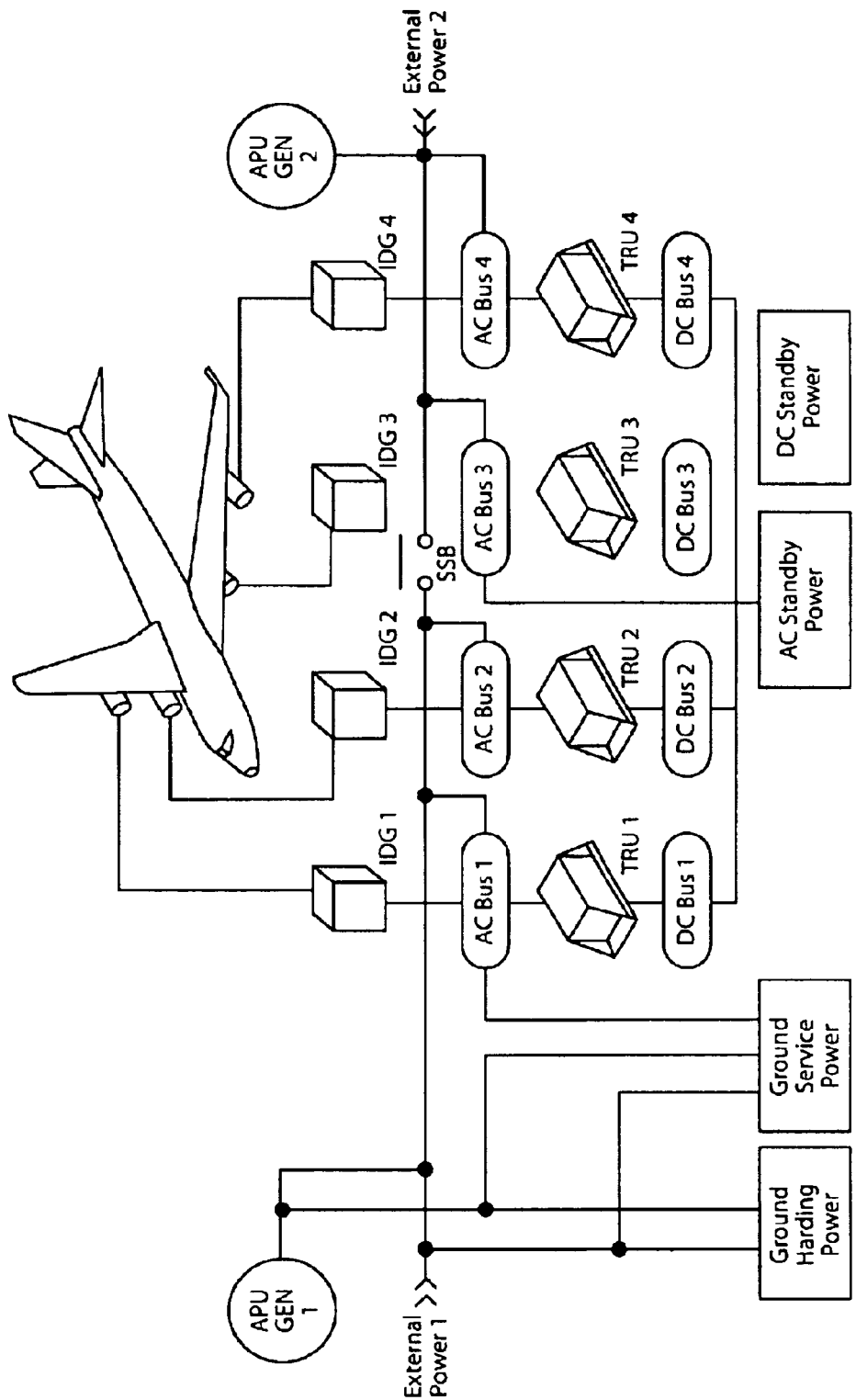
FIG. 1 is a configuration diagram of a conventional electrical power system for an aircraft.
Figure 2:
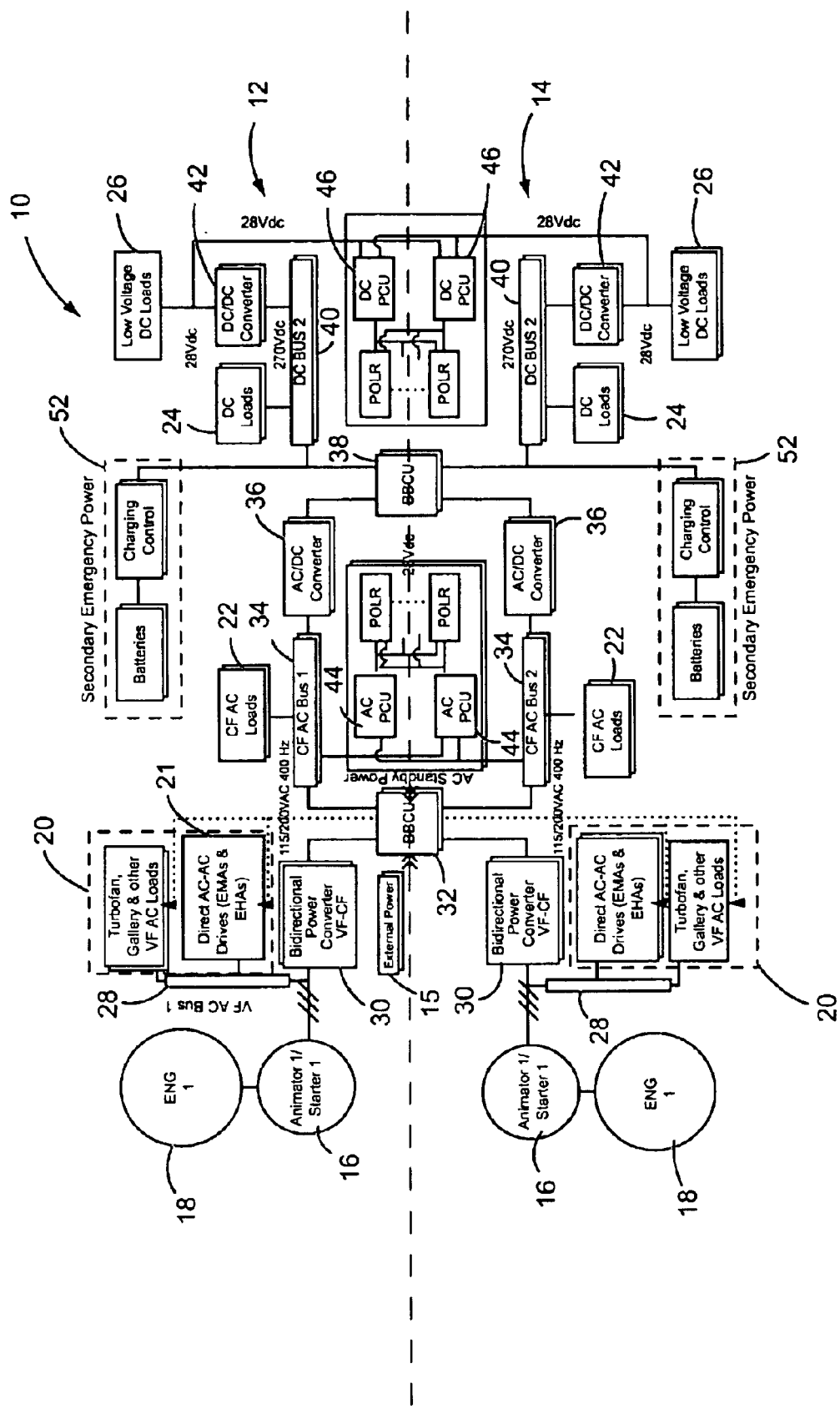
FIG. 2 is a block diagram of a system for regulating, conditioning and distributing electrical power an aircraft in accordance with the present invention.

As shown in FIG. 2, the system 10 of the present invention has a distributed structure with two parallel and coordinated power conversion subsystems 12 and 14, respectively, associated with each engine and alternator onboard on the aircraft, and two bi-directional power bus controller units (BBCUs) 32 and 38 coupled there between which are further described herein. Each subsystem includes a simple variable speed alternator 16 which mounts directly to the shaft (not shown) of an engine 18 on the aircraft. The system 10 takes the power directly from the alternators 16, the frequency of which varies in proportion to the changing speed of the shaft of the corresponding engine. The frequency typically ranges between 360 Hz to 720 Hz. Because the system 10 eliminates the use of IDGs, for the reasons previously set forth herein, it is lighter, cheaper, more reliable and easier to support. While the system 10 of FIG. 2 is shown to be powered by two engines, it can be appreciated that the invention applies to aircrafts having four or any other number of engines, and that the number of subsystems will increase or decrease accordingly.

Each engine 18 supplies AC power for a variety of different loads onboard the aircraft. Such loads typically include VF AC loads 20, CF AC loads 22, high-voltage DC loads 24 and low-voltage DC loads 26. While the invention will be further described herein with respect to subsystem 12, it can be appreciated by one skilled in the art that subsystem 14 has a similar structure and operates in a similar manner as subsystem 12.

Figure 3:
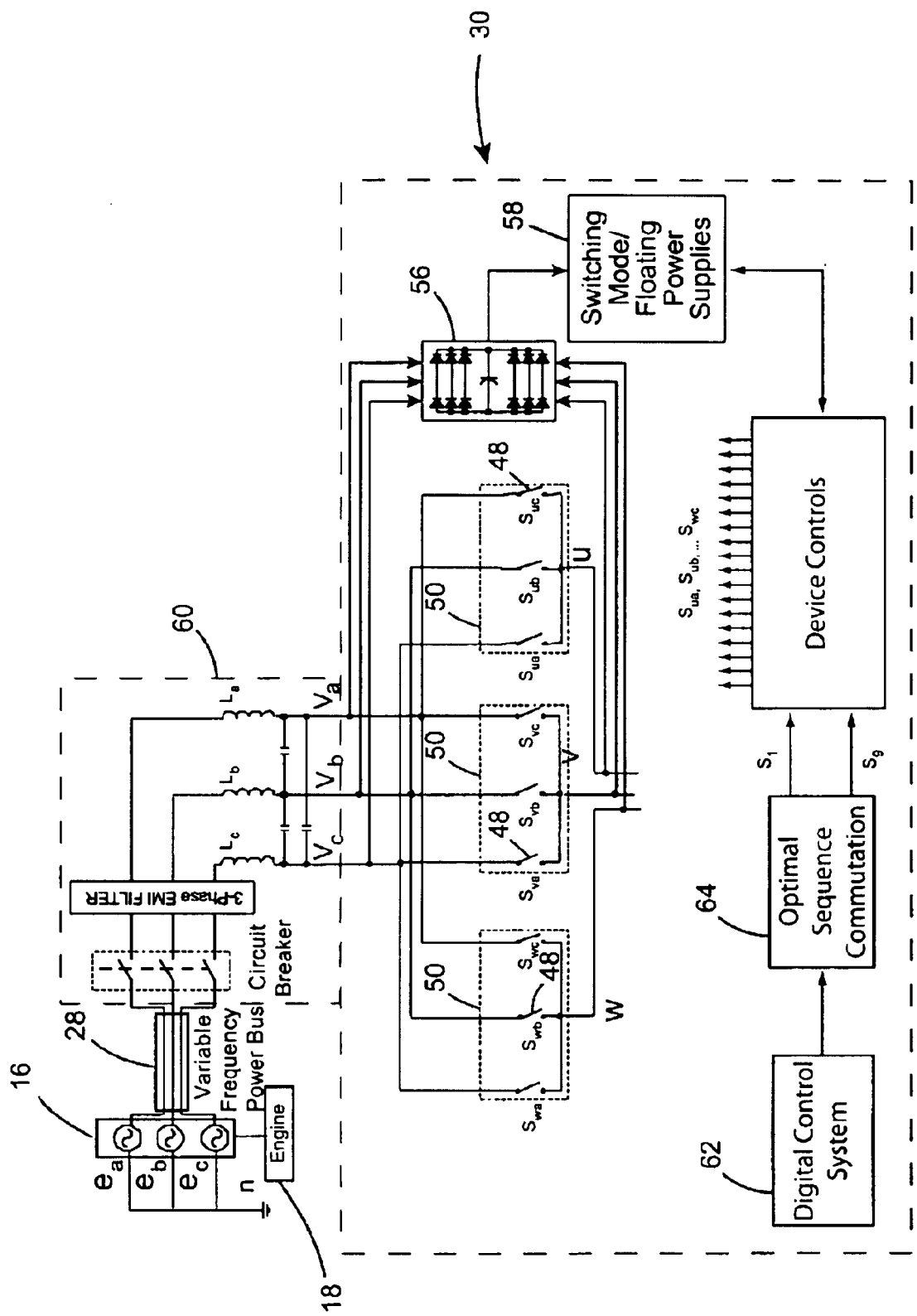
FIG. 3 is a schematic diagram of one embodiment of the power converter of FIG. 2.

As can be seen from FIG. 2, the loads are optimally partitioned such that power is not unnecessarily conditioned or "handled." In particular, VF AC power generated by alternator 16 is first supplied directly to the VF AC loads 20 coupled to VF AC bus 28. VF AC loads 20 may include without limitation turbofans, lighting appliance, and AC gallery loads. They may also include high performance loads 21 such as electromechanical actuators (EMAs) and electrohydrostatic actuators (EHAs) used for example to open and close the landing gear doors and other AC motor applications. Unlike low performance VF AC loads 20, high performance VF AC loads 21 require AC to AC VF-input power converters (not shown, but similar to that shown in FIG. 3) to interface with the VF AC bus 28.

The remaining loads of system 10 require that the VF AC power generated by alternator 16 be first converted to CF AC power. Instead of using IDGs, system 10 uses a power converter 30 to perform such conversion. One embodiment of a three phase, one stage VF to variable voltage and adjustable frequency (VVAF) power converter for use in the system of FIG. 2 and its interface 60 with VF AC bus 28 is shown with reference to FIG. 3. Unlike cycle-converters (that are based on the principle of natural commutation and phase angle control technique), power converter 30 is controlled by pulse-width modulation (PWM) at both its input and output. Power converter 30 is adapted to accept a wide variation of input power frequency that is in proportion to the shaft rotating speed of alternator 16 driven by engine 18. The capability to accept widely variable frequency power input is achieved by precisely identifying the input frequency and phase angle in real time.

Figure 4:
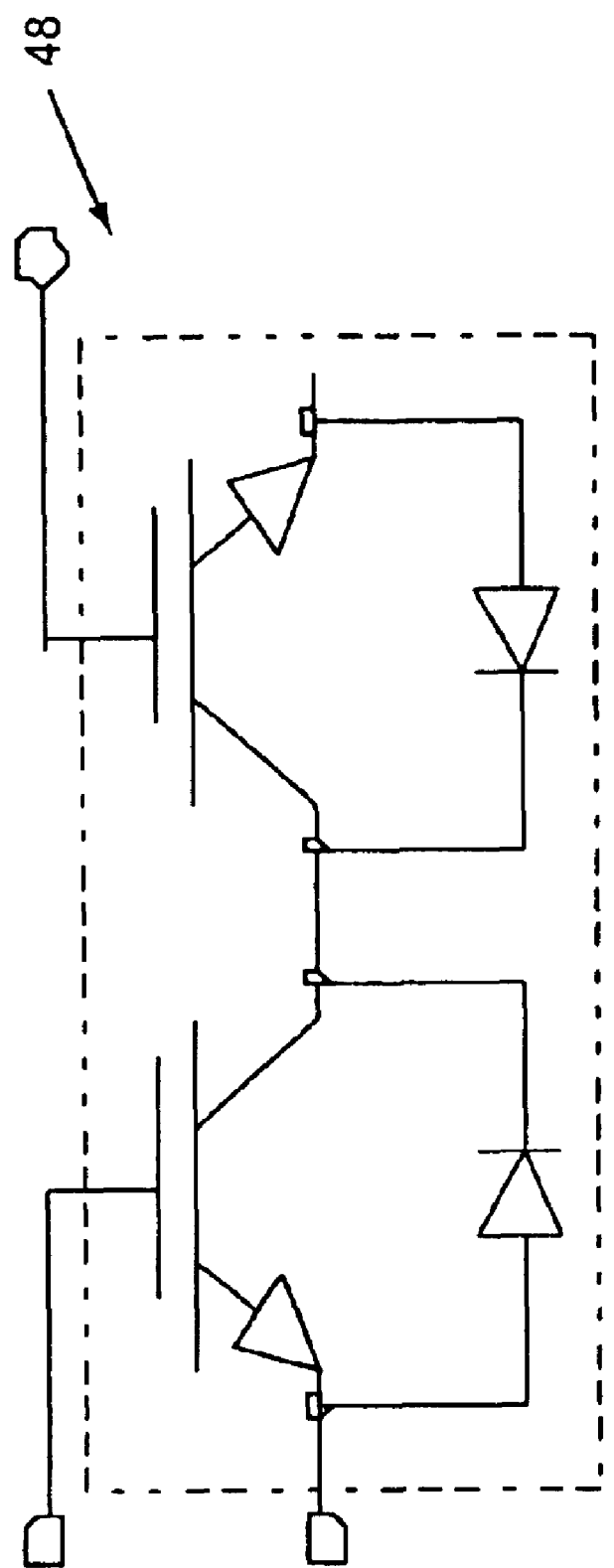
FIG. 4 is a schematic diagram of one embodiment of the bi-directional power switches of FIG. 3.

The circuitry of power converter 30 consists of a plurality of AC semiconductor power switches 48 ($S_{jk}$) that are integrated into bi-directional power modules (IBPMs) 50, which each form a 3-to-1 phase power conversion bank. One embodiment of such switches 48 is shown in FIG. 4. This bank can be used as the common building block for multiple phase converters with multiple functions. As a result, the need for many different application-specific DC-link type converters is eliminated. The IBPMs 50 on the input side are switched synchronously with the frequency changes received by power converter 30 from the alternator 16 to achieve an adaptive control of power conversion there through. On the output side, power converter 30 provides either variable-voltage and VVVF power or CF power with regulated voltage control. Power converter's modular phase bank preferably includes or directly interfaces with circuitry 56 to perform clamping to protect power converter 30 from unexpected transients. The energy created therefrom is used to provide a set of switching-mode power supplies 58 for the IBPMs 50 and AC power switches 48.

Control of the operation of the switches 48 and IBPMs 50 is provided by a digital control system 62. Digital control system 62 includes a digital signal processor (not shown) and supporting electronics circuits to perform a variety of known control functions such as data acquisition and signal processing, voltage and current sensing, frequency identification, synchronization, and PWM control in order to determine the appropriate configuration of the switches 48 and IBPMs 50 based on the power control requirements of the system. The mathematical relationships between the voltages and currents in the input and output and the switching functions of the power converter 30 are given in the following equations:

$$\begin{bmatrix} V_{uv} \\ V_{vw} \\ V_{wu} \end{bmatrix} = \begin{bmatrix} S_{ua}-S_{va} & S_{ub}-S_{vb} & S_{uc}-S_{vc} \\ S_{va}-S_{wa} & S_{vb}-S_{wb} & S_{vc}-S_{wc} \\ S_{wa}-S_{ua} & S_{wb}-S_{ub} & S_{wc}-S_{uc} \end{bmatrix} \begin{bmatrix} V_{ar} \\ V_{br} \\ V_{cr} \end{bmatrix} \quad (1)$$

$$\begin{bmatrix} i_a \\ i_b \\ i_c \end{bmatrix} = \begin{bmatrix} S_{ua} & S_{va} & S_{wa} \\ S_{ub} & S_{vb} & S_{wb} \\ S_{uc} & S_{vc} & S_{wc} \end{bmatrix} \begin{bmatrix} i_u \\ i_v \\ i_w \end{bmatrix} \quad (2)$$

wherein the input source voltages are described by the following equations:

$$V_{an}=V_{im}\cos(\omega_i t-\psi_i) \quad (3)$$

$$V_{bn}=V_{im}\cos(\omega_i t-\psi_i-120°) \quad (4)$$

$$V_{cn}=V_{im}\cos(\omega_i t-\psi_i+120°) \quad (5)$$

$S_{jk}$ is the bilateral switch in each phase of the power converter circuitry in which $j \in \{u, v, w\}$ represents the phase on the load side, and $k \in \{a, b, c\}$ represents the phase on the input side. With such a configuration, power converter 30 has an efficiency rate of approximately 97.5% and above and as a result, is over 25% more efficient than its IDG counterpart.

The output of the digital control system 62 is fed through an optimal sequence commutator 64 and to then control the appropriate IPBMs 50 and switches 48. While the power converter has been described with respect to the circuitry shown in FIG. 3, it can be appreciated that any power converter that is bi-directional, regenerative, controlled by PWM and converts VF AC power to CF AC power and vice-versa can be used, such as that disclosed in U.S. Pat. No. 5,892,677, which is incorporated in its entirety herein by reference.

Referring back to FIG. 2, CF AC power from converter 30 is distributed to the remaining loads 22, 24, and 26 first and second power bus controllers 32 and 38, respectively. Each controller essentially acts as an on/off switch for controlling the flow of power through system 10. They, along with bi-directional power converter 30 and AC/DC converter 36, also allow for the selective and automatic reconfiguration of the direction of the flow of power through system 10. With such a configuration, the varying power requirements of system 10 and any power failures therein can be attended to. In particular, each power bus controller provides for the isolation of any faulty circuit within system 10 and the ability of reconfigurable power control to "steal" or redirect power from other "healthy" sources within system 10. While the system 10 is shown with two power bus controllers 32 and 38, it can be appreciated that only one controller may be necessary depending on the number and types of loads onboard the aircraft.

In one embodiment as shown in FIG. 2, each power bus controller represents an enclosure which houses a collection of power switching devices known as contactors (not shown) which are used to connect the electrical power from its source or sources to the appropriate load buses. While FIG. 2 shows each controller packaged as a single device, it can be appreciated that the contactors can and often are individually distributed throughout the airframe without the need for an enclosure. The configuration used depends on the physical constraints (such as weight, volume and available space) as well as the operational constraints (such as supportability, survivability and maintainability) of the system. For example, there may not be enough space in the airframe to house all the contactors in a single enclosure. Likewise, it may not be desirable from an operational point of view to house too many system functions in a single enclosure since a single failure event could cause multiple power losses. Accordingly, any reference to a controller herein is meant to encompass either configuration.

Referring back to FIG. 2, CF AC loads 22 are supplied CF AC power from power converter 30 via power bus controller 32 and a CF AC bus 34 coupled thereto. CF AC loads 22 may include without limitation high horsepower induction fan motors and synchronous motor. In one embodiment, CF AC bus 34 operates at 115/120 volts and 400 Hz. An AC/DC power converter 36 is coupled to CF AC bus 34 and converts CF AC power to DC power. The AC/DC power converter shares the same core circuits in its power train and control electronics as those in power converter 30, with minor changes, such as reducing one phase bank circuit, changing the control in firmware, and adding an output low-pass filter. This supports a common modular hardware design for multiple power converters. Second power bus controller 38 is coupled between the AC/DC power converter 36 and a DC bus 40 to which high voltage DC loads 24 are connected. DC loads 24 may include without limitation heaters, avionic power supplies, lighting power supplies and directed energy device power supplies. System 10 may further include a DC/DC power converter 42 coupled between the DC bus 40 and low voltage DC loads 26 for converting high voltage DC power to low voltage DC power. Low-voltage DC loads 26 may include without limitation point-of-load DC power regulators (POLR), relay/contactor coils, solenoids and lights.

System 10 may also include one or more AC and DC power conditioners 44 and 46, respectively, to help regulate the power being distributed throughout system 10 and maintain it within certain required operating limits. System 10 also preferably includes at least one secondary emergency DC power source 52 coupled to second controller 38 in the event of a complete power failure.

While the invention has been described thus far with power flowing in a direction from left to right, the bi-directional nature of power converter 30, controllers 32 and 38, and AC/DC power converter 36 allow power to also flow in a direction from right to left. With such a configuration, while AC/DC power converter 36 converts DC power to CF AC power, power converter 30 converts CF AC power to VF AC power. An example of such an application is the use of external or ground power 15 to start the engine 18. As a result, CF AC power provided by power source 15 or even DC back up power 52 can be used to drive the alternators 16 as a motor to start the engines 18. In addition, power can be provided to any load within system 10 that has lost its "primary" power source. Without such a configuration, a separate power converter for each such application would be required, thereby increasing the costs and power losses associated with the operation of the system.

By replacing the existing fixed and centralized CF AC-based electrical power systems with a VF distributed electrical power system of the present invention, by implementing bi-directional power converters, and by grouping and partitioning the loads in such a manner, an aircraft's lifecycle costs can be reduced, reliability and dispatchability can be improved, and thus overall energy efficiency can be increased.

While the invention has been illustrated and described in connection with several preferred embodiments, it will be appreciated that further changes can be made therein without departing from the spirit and scope of the invention. For example, while the invention has been discussed with reference to a commercial aircraft, it applies equally to other types of aircraft such as military aircraft. Accordingly, it is intended that the scope of the invention not be limited by the disclosure of the preferred embodiments, but instead be determined entirely by reference to the claims that follow.

We claim:

1. A system for regulating electrical power distribution on an aircraft, comprising:
    an alternator adapted to directly connect to an engine on the aircraft and generate variable frequency AC power;
    a variable frequency AC bus coupled directly to the alternator;
    at least one variable frequency AC load coupled directly to the variable frequency AC bus;
    a power converter coupled directly to the alternator and adapted to convert the variable frequency AC power generated by the alternator into constant frequency AC power;
    at least one constant frequency AC load;
    a constant frequency AC bus coupled between the at least one constant frequency AC load and the power converter; and
    a first power bus controller coupled between the power converter and the constant frequency AC bus and adapted to control a flow of power therethrough.

2. The system of claim 1, wherein the power converter is bi-directional such that it can also convert constant frequency AC power to variable frequency AC power.

3. The system of claim 1, wherein the power converter is pulse width modulated.

4. The system of claim 2, wherein the first power bus controller is bi-directional and adapted to selectively and automatically reconfigure the direction of the first flow of power therethrough.

5. The system of claim 4, further comprising:
    at least one high-voltage DC load;
    a high-voltage DC bus coupled to the at least one high-voltage DC load; and
    an AC/DC power converter coupled between the constant frequency AC bus and the DC bus and adapted to convert the constant frequency AC power to high-voltage DC power.

6. The system of claim 5, wherein the AC/DC power converter is bi-directional and adapted to convert DC power to constant frequency AC power.

7. The system of claim 6, further comprising a second power bus controller coupled between the AC/DC converter and the DC bus and adapted to control a second flow of power therethrough.

8. The system of claim 7, wherein the second power bus controller is bi-directional and adapted to selectively and automatically reconfigure the direction of the second flow of power therethrough.

9. The system of claim 7, further comprising:
    at least low voltage DC load; and
    at least one DC/DC power converter coupled between the DC bus and the low voltage DC load and adapted to convert DC power to low-voltage DC power.

10. The system of claim 5, further comprising:
    a first power conditioner coupled to the constant frequency AC bus; and
    a second power conditioner coupled to the DC bus.

11. The system of claim 7, further comprising an emergency power source coupled to the second controller.

12. The system of claim 1, further comprising:
    at least one variable frequency high performance AC load; and
    an AC to AC power converter coupled between the at least one variable frequency high performance AC load and the alternator.

13. A system for regulating and distributing electrical power to a plurality of loads on an aircraft, each load having a load type, comprising:
    a first electrical power subsystem adapted to connect to a first engine on the aircraft;
    a second power subsystem in parallel with the first electrical power subsystem and adapted to connect to a second engine on the aircraft; and
    at least one first power bus controller coupled between the first electrical power subsystem and the second electrical power subsystem and adapted to selectively and automatically reconfigure the distribution of electrical power to the loads based on the load type.

14. The system of claim 13, wherein the first power bus controller is bi-directional.

15. The system of claim 14, further comprising:
a third electrical power subsystem adapted to connect to a third engine on the aircraft;
a fourth electrical power subsystem adapted to connect to a fourth engine on the aircraft; and
at least one second power bus controller coupled between the third and fourth electrical power subsystems and adapted to selectively and automatically reconfigure the distribution of electrical power through the system.

16. The system of claim 15, wherein the second power bus controller is bi-directional.

17. A method of regulating and distributing electrical power on an aircraft, comprising the steps of:
generating variable frequency AC power from an alternator adapted to connect to an engine on the aircraft;
distributing the variable frequency AC power to at least one variable frequency AC load coupled to an output of the alternator
converting the variable frequency AC power to a constant frequency AC power with a bi-directional power converter; and
distributing the constant frequency AC power to at least one constant frequency AC load coupled to the bi-directional power converter.

18. The method of claim 17, further comprising;
converting the constant frequency AC power to DC power with a bi-directional AC/DC power converter; and
distributing the DC power to at least one DC load coupled to the bi-directional AC/DC power converter.

19. The method of claim 17, further comprising selectively and automatically reconfiguring the direction of a flow of power through the system.

20. The method of claim 17, further comprising distributing the variable frequency AC power to at least one variable frequency high performance load.

21. A method of regulating the distribution of a flow of electrical power to loads on an aircraft, each load having a load type, comprising:
converting a first flow of electrical power through a first bi-directional power converter;
converting a second flow of electrical power through a second bi-directional power converter; and
selectively and automatically reconfiguring the direction of the first and second flows of power through the first and second bi-directional power converters, respectively, based on the load type.

* * * * *